(No Model.)
J. H. BUNNELL & T. A. CASEY.
IMPLEMENT FOR THROWING OR DISCHARGING LIQUIDS IN FORM OF STREAMS.
No. 594,520. Patented Nov. 30, 1897.
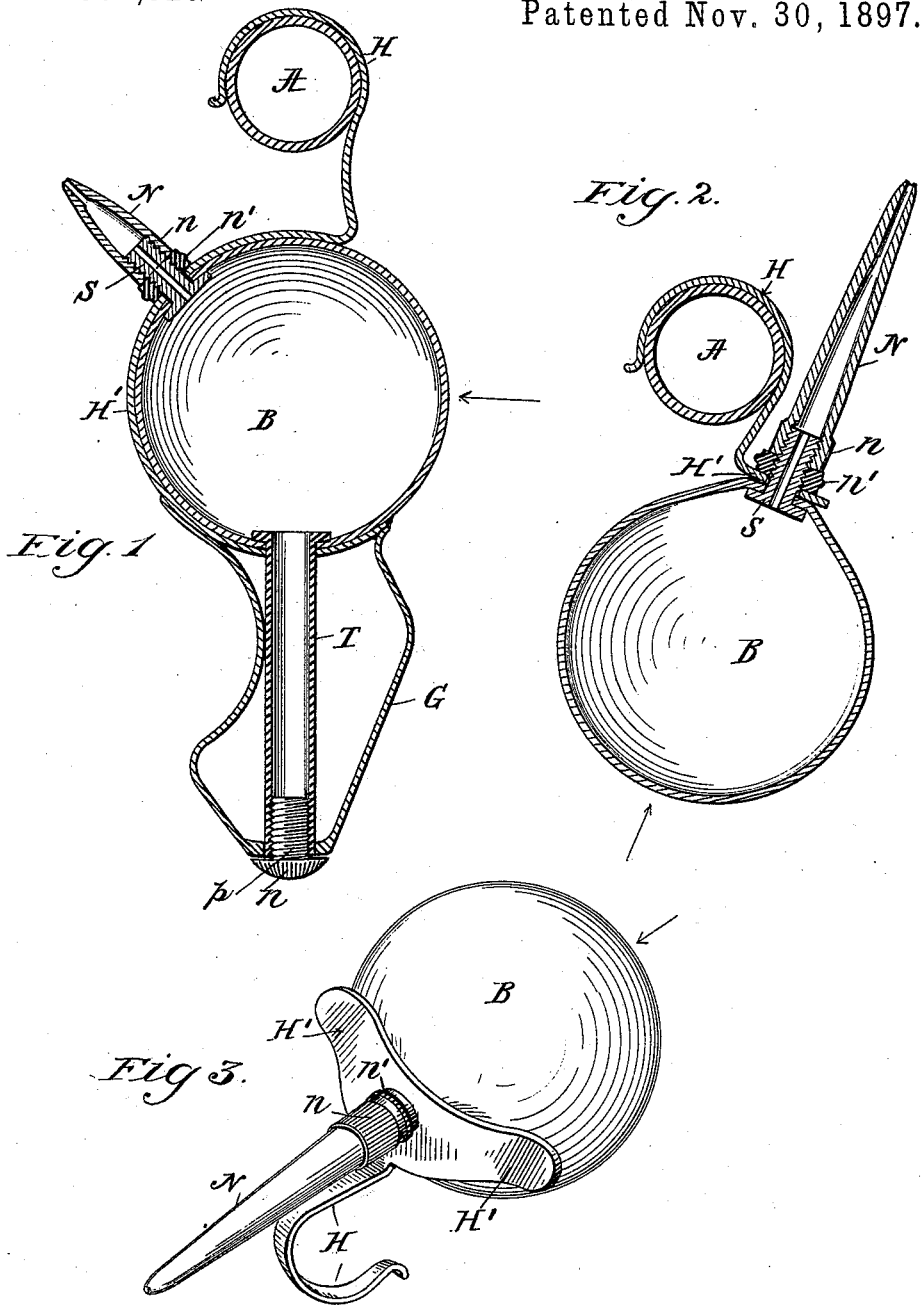

UNITED STATES PATENT OFFICE.

JESSE H. BUNNELL, OF BROOKLYN, NEW YORK, AND THOMAS A. CASEY, OF PASSAIC, NEW JERSEY, ASSIGNORS, BY DIRECT AND MESNE ASSIGNMENTS, TO SAID BUNNELL AND CHARLES J. KINTNER, OF NEW YORK, N. Y.

IMPLEMENT FOR THROWING OR DISCHARGING LIQUIDS IN FORM OF STREAMS.

SPECIFICATION forming part of Letters Patent No. 594,520, dated November 30, 1897.

Application filed February 15, 1897. Serial No. 623,367. (No model.)

*To all whom it may concern:*

Be it known that we, JESSE H. BUNNELL, residing at Brooklyn, in the county of Kings and State of New York, and THOMAS A. CASEY, residing at Passaic, in the county of Passaic and State of New Jersey, citizens of the United States, have made a new and useful invention in Implements for Throwing or Discharging Liquids in the Form of a Stream, of which the following is a specification.

Our invention is confined to a portable implement for use by persons while riding bicycles, or in any place where it becomes necessary to make a defense against vicious persons or savage dogs.

The invention will be fully understood by referring to the accompanying drawings, in which—

Figure 1 is a vertical sectional view taken through the body of our preferred form of implement, and Fig. 2 is a similar sectional view taken through the body of the modified form thereof, Fig. 3 being a perspective view of this latter modified form shown in Fig. 2.

Referring now to the drawings in detail for a full and clear understanding of our invention and first to Fig. 1, H' represents a semispherical or cup-shaped holding device for securing in its hollow interior a soft-rubber or equivalent elastic or yielding ball or chamber B.

H represents an upwardly-extending hook, which is preferably an integral part of the holding device H' and is designed for the purpose of hanging the implement upon a bicycle-handle A or in any analogous position upon a vehicle.

G represents a handle or grip, shown in this instance to be in the form of a pistol-grip, and is secured to the holding device H' by brazing or in any preferred manner, or it may be constructed integral therewith, if so desired.

T represents a filling-tube, which has at its inner end an enlarged head and is adapted to hold or secure the rubber or equivalent elastic or yielding ball or chamber B firmly in position when in place, n being a sealing-cap with a milled head screw-threaded at p and adapted to effectually seal the lower end of the tube T.

S represents a hard-rubber or equivalent nipple having an enlarged head at its inner end and adapted to be inserted through an opening in the elastic or yielding ball or chamber B and then pass outwardly through a corresponding opening in the holding device H', after which it (the nipple) is secured in position by a set-nut $n'$, N being a nozzle having screw-threads $n$ at its inner end, adapted to secure it firmly upon the outer end of the nipple and against the set-nut $n'$.

To fill the implement, the sealing-cap $n$ is removed and a diluted solution of ammonia or any other harmless liquid is poured into the chamber B until the same is full. The sealing-cap $n$ is then restored to position and the apparatus is ready for use. If used with a bicycle or carriage, it is hung by the hook H, in close proximity to the rider, upon the handle-bars A or upon any support on the dashboard or at any convenient point within easy access of the rider. When attacked by a savage dog or vicious person, the rider has simply to reach forward and grasp the implement by the grip G and then place his or her thumb firmly upon the outer surface of the free or exposed side of the elastic or yielding chamber B and force it inward, thereby causing the contained liquid to be ejected in the form of a stream through the interior of the nipple S and out of the nozzle N. With such an implement we find that it is possible to throw a stream of liquid with great force and precision of aim, the pistol-like nature of the implement enabling the user to take an accurate sight and use considerable power in compressing the confined body of liquid in the chamber B, owing to the stability of the cup-shaped holding device H'.

In the modified form shown in Fig. 2 there is but one opening in the chamber B and the nipple S. Set-nut $n'$ and nozzle N are made to perform the function of effectually sealing the chamber and also of holding the cup-shaped holding device H' and hook H in a manner which will be obvious on inspection of the drawings. To fill this form of the apparatus, it is only necessary to remove the nozzle N and fill it in the same manner as ordinary syringes are filled by ejecting the air from the part B and then holding the nipple S beneath the surface of the liquid in a basin, so as to allow it (the liquid) to be drawn in, after which the nozzle is restored and the implement is ready for use.

It will be apparent on inspection of Fig. 1 that, if preferred, the filling-tube T might be done away with and this form of the implement filled in the same manner by removing the nozzle N.

In using the form of the apparatus shown in Figs. 2 and 3 the user simply grasps the chamber B so that the curvilinear extensions of the parts H' will be held by the first and second or second and third fingers of the hand, placing the thumb firmly against that part of the ball or chamber B which is in direct alinement with the axis of the nozzle N, as shown by the arrow on the right. (See Fig. 3.) While this form of the device renders it possible to aim with reasonable certainty and while the curved arms of the holding device H' will react with sufficient force against the part B when actuated as described, the application of power is not as effectual nor as easy for the user as in our preferred form, disclosed in Fig. 1, it being obvious that the grip G and cup-shaped holding device H' enable the user to obtain the best results.

We are aware that it is not broadly new in the art for persons to defend themselves against the attacks of vicious dogs or persons by ejecting liquids from devices in the nature of syringes, such implements having been in general public use in connection with bicycles for a number of years, and we therefore make no claim hereinafter broad enough to include, generically, the application of a syringe or equivalent compressible chamber provided with a nozzle for the purpose indicated, our most generic claims being directed to the combination of such an implement with a holding device or grip which shall enable the user to better apply force in ejecting the liquid, and also to more effectually aim the implement in use, and our claims are generic as to this particular, and also as to the combination of a holding device or grip with a sustaining hook or device which constitutes a part of or is attached directly to the implement itself, and in such manner as to enable one to suspend it (the implement) in close proximity to himself or herself for immediate use.

We are aware that heretofore a "water-gun" has been devised consisting of a compressible ball or bulb having a nozzle, and all inclosed in a chamber of pistol-like conformation, but provided with a trigger for acting by compression upon the ball or bulb in such manner as to eject a contained liquid from the nozzle, and we make no claim hereinafter broad enough to include such a structure, our most generic claims hereinafter made being directed to a compressible or yielding chamber provided with a nozzle and sustained in such manner that the chamber itself may be compressed directly by the action of the hand of the user, so as to enable him or her to forcibly eject the contents of the compressible chamber in the manner hereinbefore described.

We make no claim hereinafter to a portable implement for throwing liquid in the nature of a stream, which portable implement is designed to contain a confined body of liquid and is provided with a grip or holding device for permitting the user to aim the implement, nor to such an implement when combined with a hook or retaining device designed to hang the same upon the handle-bars of a bicycle or upon the dashboard of a vehicle or at any point in close proximity to the user, as these features are, so far as we are aware, the invention of Jesse H. Bunnell, one of the parties to this present invention, and Charles J. Kintner, of New York, county and State of New York, as disclosed in their application for a patent bearing Serial No. 621,706, filed in the United States Patent Office on the 2d day of February, 1897.

Having thus described our invention, what we claim, and desire to secure by Letters Patent of the United States, is—

1. A portable implement for throwing liquids in the form of a stream, consisting of a hollow elastic or yielding chamber provided with a nozzle, in combination with means for holding said chamber against pressure exerted on one side and at a point substantially opposite to the nozzle, said elastic or yielding chamber being sustained in an exposed position so that it may be acted upon directly by the hand of the user substantially as described.

2. A portable implement for throwing liquids in the form of a stream, consisting of a hollow elastic or yielding chamber provided with a nozzle and means for holding said chamber firmly in the hand of the user, in combination with a sustaining device in the nature of a hook, the same constituting a part of the implement and adapted to sustain the implement at some point of easy access to the user, substantially as described.

3. A portable implement for throwing liquids in the form of a stream, consisting of a hollow elastic or yielding chamber having a nozzle and retaining or holding means in the nature of a grip, said parts being so arranged as to adapt the implement for use after the manner of a pistol, the compressible part of the yielding chamber being exposed to the direct action of the hand of the user, substantially as described.

4. A portable implement for throwing liquids in the form of a stream, consisting of an elastic or compressible chamber having a nozzle, in combination with means which partially surrounds or incloses said chamber in such a manner as to expose it directly to the compressive action of the hand of the user, and a filling-tube, substantially as described.

5. A portable implement for throwing liquids in the form of a stream, consisting of a hollow elastic or compressible chamber having a nozzle and a holding device or grip, which partially surrounds the compressible chamber and leaves it directly exposed to the hand of the user in combination with a sustaining device which constitutes a part of the implement and is adapted to sustain it at some point of easy access to the user, substantially as described.

6. A portable implement for throwing liquids in the form of a stream, consisting of a compressible chamber sustained by a holding device which partially surrounds said compressible chamber so as to leave it exposed to the hand of the user and thereby adapt it to react against the compressive action of the user's hand, in combination with a nozzle and a sustaining device in the nature of a hook adapted to sustain the implement at some point of easy access to the user, substantially as described.

In testimony whereof we have hereunto subscribed our names this 13th day of February, 1897.

JESSE H. BUNNELL.
THOMAS A. CASEY.

Witnesses:
M. M. ROBINSON,
CHARLES WEBER.